F. M. CARHART & A. VAN DE WATER.
TIRE RETAINER.
APPLICATION FILED SEPT. 23, 1911.
1,052,129.
Patented Feb. 4, 1913.
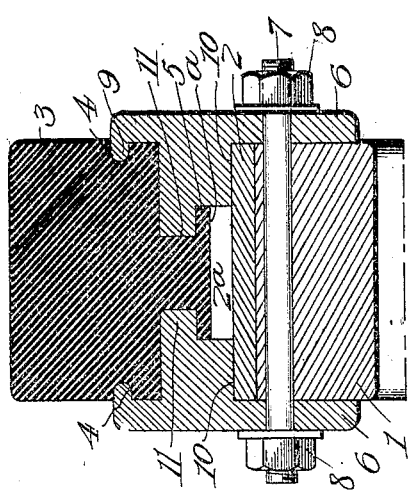
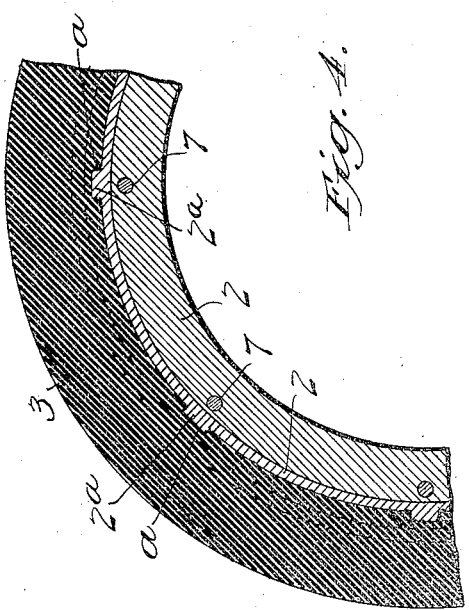
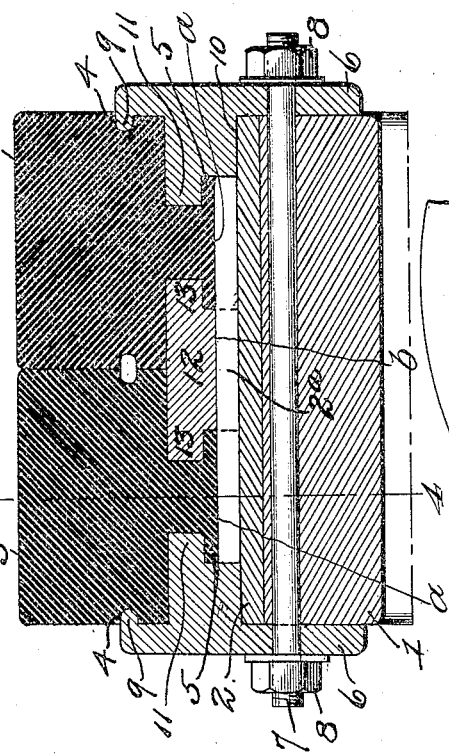
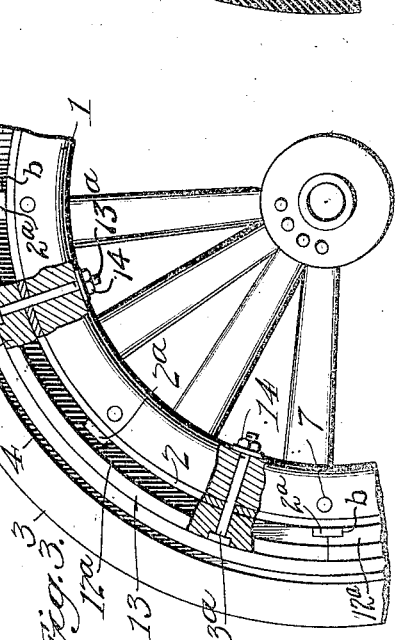
Inventor
Franklyn M. Carhart and
Archibald Van de Water,
Witnesses
By
Their Attorney

UNITED STATES PATENT OFFICE.

FRANKLYN M. CARHART, OF SEA CLIFF, AND ARCHIBALD VAN DE WATER, OF GLEN COVE, NEW YORK.

TIRE-RETAINER.

1,052,129.  Specification of Letters Patent.  Patented Feb. 4, 1913.

Application filed September 23, 1911. Serial No. 650,978.

*To all whom it may concern:*

Be it known that we, FRANKLYN M. CARHART and ARCHIBALD VAN DE WATER, citizens of the United States, residing, respectively, at Sea Cliff, county of Nassau, and State of New York, and Glen Cove, in the county of Nassau and State of New York, have invented certain new and useful Improvements in Tire-Retainers, of which the following is a specification.

The present invention relates in general to vehicle tires, and more particularly to a novel and improved manner of constructing resilient tire members and securing the same in position upon the rim or felly of a wheel so that they are held securely against creeping or slipping.

One of the objects of the invention is to provide a novel tire retaining device by means of which either a single tire or a plurality of tires may be secured to the wheel felly, and in which the tires and locking plates are interchangeable, thereby enabling the tire or tires to be easily and quickly removed from a wheel without the loss of time which is incident to placing particular parts in certain positions.

A further object of the invention is to provide a tire retaining device which is comparatively simple and inexpensive in its construction, which does not require the use of any special tools, and which admits of rubber tires being readily replaced by the chauffeur while on the road.

The invention is more especially adapted for use upon heavy automobiles, trucks, vans and the like, and where a plurality of rubber tires are applied to each wheel, the said tires may be fitted closely together so as to have the appearance of a single broad tire.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a transverse sectional view through the felly of a wheel provided with a plurality of rubber tires which are constructed and retained in position in accordance with the general principles of the present invention. Fig. 2 is a similar view through the felly of a wheel having a single rubber tire member applied thereto. Fig. 3 is a side elevation of a portion of a wheel, showing a slight modification, one of the tire members and retaining plates being removed, and portions being shown in section, and Fig. 4 is a sectional view through a portion of the tire, said view being taken on the line 4—4 of Fig. 1.

Corresponding and like parts are referred to in the following description and indicated in all the views of the drawings by the same reference characters.

Specifically describing the present embodiment of the invention, the numeral 1 designates the felly of a wheel, the said wheel and felly being of any conventional or approved construction. A band 2 is fitted upon the felly 1 in the usual manner, and the resilient tires 3 are slipped upon the band 2. As indicated upon Figs. 1 and 3 of the drawing, a plurality of the tires 3 is fitted upon the felly 1, while as illustrated by Fig. 2, a single tire 3 is slipped upon the felly. These tires 3 are symmetrical in cross section, and it will consequently be apparent that they are both interchangeable and reversible. Each of the tires is provided upon opposite sides thereof with annular grooves 4, and an annular tongue 5, which is substantially of an inverted T shape in cross section, projects from the base of each of the tires at the middle portion thereof.

Circular retaining plates 6 are fitted against opposite sides of the felly 1, the said plates being held in position by means of bolts or similar fastening members 7 which extend transversely through both the plates and the felly and are capped at opposite ends thereof by nuts 8. These retaining plates 6 extend outwardly along the sides of the tires 3, and are provided at the outer edges thereof with annular lips 9 which are received within the corresponding grooves 4. The inner face of each of the plates 6 is also formed with an annular shoulder 10 which extends over the band 2 and fits under the base of the tire at the side thereof, the said shoulder being formed with an annular flange 11 which fits over one side of the head of the tongue 5 of the tire and interlocks therewith.

For the purpose of preventing any creeping of the tires, the band 2 is provided at suitable intervals with transversely disposed ribs 2ª, shown more clearly in Figs. 1 and 4. These ribs engage suitable notches $a$ in the tongues 5 of the tires, and also engage notches $b$ in the ring 12. Both the ring and tires are thereby held against longitudinal movement, although they can be readily slipped in position from either side of the wheel.

Where there is but a single tire, as indicated by Fig. 2, the two retaining plates 6 applied to opposite sides of the felly and the ribs 2ª are all that is necessary to hold the tire in position, the said tire being gripped at the base thereof by the flanges 11, at the sides thereof by lips 9, and at the base thereof by the ribs 2ª. Where a plurality of tires 3 are arranged side by side, however, as indicated by Fig. 1, a ring 12 is arranged between each pair of adjacent tires. This ring may be integral, in which event it is merely slipped loosely over the band 2, the said ring fitting under the bases of the tires and being formed upon opposite sides thereof with the annular flanges 13 which correspond to the flanges 11 of the retaining plates 6 and interlock in a similar manner with the inverted T-shaped tongues 5 of the tires. It will be observed that the shoulder 10 and flange 11 of each of the retaining plates has a section similar to one-half of the section of the ring 12, so that the tires are both reversible and interchangeable. This has the advantage of enabling the tire to be quickly placed in position or removed therefrom by unskilled labor, and also renders the life of the tire much longer than would be possible with a construction in which the parts were not interchangeable and in which each part must be placed in a certain predetermined position.

A slight modification is shown in Fig. 3 in which the intermediate ring is formed in a plurality of segmental sections 12ª, the said sections being secured to the felly 1 by means of suitable fastening members such as the bolts 13ª. These bolts preferably have flat square heads which are embedded in the ring sections 12ª, the inner ends of the bolts extending through the felly 1 where they are capped by nuts 14. This construction may be found desirable under certain conditions of use, and it will be apparent that it is quite immaterial so far as the invention is concerned, whether the ring be formed integral or in a number of sections.

With this invention, it is not necessary to carry a large amount of metal in order to provide an extra tire, as is now the case with all heavy trucks, but the rubber tire alone is carried, and it can be readily applied to the wheel while on the road, which is impossible with the tires now commonly employed for heavy vehicles. It will thus be obvious that a construction has been provided in which the tires may be formed entirely of rubber, without the necessity of embedding any metal or the like therein, which admits of the tires being quickly placed in position or removed therefrom, and which holds the tires securely against creeping or displacement when the vehicle is in use.

Having thus described the invention, what we claim as new and desire to secure by Letters Patent, is:—

1. A tire retainer for vehicle wheels comprising in combination with the wheel felly, a tire arranged over the wheel felly and provided at its base with an annular tongue of an inverted T-shape in cross section, said tire also having an interlocking engagement with the felly-band, retaining plates applied to the felly provided with flanges interlocking with and overlying the lateral projections of said T-shaped tongue, and which retaining plates also present shoulders solidly abutting against the under side of the tire above the tongue projections, and means for holding the retaining plates in position.

2. A device of the character described including a wheel felly, a plurality of tires slipped over the wheel felly and having a symmetrical cross section, each of the tires being provided at the base thereof with an annular tongue, a ring arranged upon the felly between each adjacent pair of the tires, the said ring fitting under the bases of the tires and having an interlocking connection with the tongues thereof, retaining plates applied to the sides of the felly and formed with annular shoulders fitting under the bases of the tires and having an interlocking connection with the tongues thereof, and means for holding the retaining plates in position.

3. A device of the character described including a wheel felly, a plurality of interchangeable tires slipped over the wheel felly and having a symmetrical cross section, each of the tires being provided at the base thereof with an annular tongue of an inverted T-shape in cross-section, a ring applied to the felly between each adjacent pair of the tires, the said ring fitting under the bases of the tires and being formed with flanges interlocking with the tongues thereof, retaining plates applied to the sides of the felly and formed with annular shoulders fitting under the bases of the tires, the said shoulders carrying flanges which have an interlocking connection with the tongues of the tires, and means for holding the retaining plates in position.

In testimony whereof we hereunto affix our signatures in the presence of two witnesses.

FRANKLYN M. CARHART.
ARCHIBALD VAN DE WATER.

Witnesses:
    FRANKLIN A. COLES,
    CAROLYN R. COLES.